United States Patent
Alleysson

(10) Patent No.: US 8,964,250 B2
(45) Date of Patent: Feb. 24, 2015

(54) DIGITAL PROCESSING FOR COMPENSATING SIGNALS EMITTED BY PHOTOSITES OF A COLOUR SENSOR

(75) Inventor: David Alleysson, Moirans (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 132 days.

(21) Appl. No.: 13/641,809

(22) PCT Filed: Apr. 18, 2011

(86) PCT No.: PCT/FR2011/050887
§ 371 (c)(1),
(2), (4) Date: May 21, 2013

(87) PCT Pub. No.: WO2011/131898
PCT Pub. Date: Oct. 27, 2011

(65) Prior Publication Data
US 2013/0258114 A1    Oct. 3, 2013

(30) Foreign Application Priority Data
Apr. 20, 2010 (FR) ................................ 10 52997

(51) Int. Cl.
| | |
|---|---|
| H04N 1/60 | (2006.01) |
| H04N 1/46 | (2006.01) |
| G03F 3/08 | (2006.01) |
| G01D 18/00 | (2006.01) |
| H03F 1/26 | (2006.01) |
| H04N 17/02 | (2006.01) |
| H04N 9/04 | (2006.01) |

(52) U.S. Cl.
CPC ............ *H04N 17/02* (2013.01); *H04N 9/045* (2013.01); *H04N 2209/047* (2013.01)

USPC ............. 358/1.9; 358/504; 358/520; 702/85; 702/196; 702/198; 382/167

(58) Field of Classification Search
None
See application file for complete search history.

(56) References Cited

U.S. PATENT DOCUMENTS

| | | | | | |
|---|---|---|---|---|---|
| 5,272,518 | A | * | 12/1993 | Vincent | 356/405 |
| 6,160,922 | A | * | 12/2000 | Hayashi | 382/274 |
| 6,395,576 | B1 | * | 5/2002 | Chang et al. | 438/70 |
| 7,009,639 | B1 | | 3/2006 | Une et al. | |

(Continued)

OTHER PUBLICATIONS

International Search Report dated Aug. 8, 2011 for Application No. PCT/FR2011/050887.

(Continued)

*Primary Examiner* — Madelein A Nguyen
(74) *Attorney, Agent, or Firm* — Frost Brown Todd, LLC

(57) ABSTRACT

The present invention relates to the acquisition of color images by a sensor including a plurality of photosites comprising spectral sensitivities that can to be different between photosites. The invention provides for a digital processing of signals emitted by the photosites, which comprises applying a spatial-chromatic transfer function to said signals, taking into account a variety of spectral sensitivities of the photosites. The sensor can then be devoid of a physical matrix of color filters. Spectral calibration of the sensor is also provided for this purpose, thus comprising the following steps: obtaining spectral sensitivity data of each photosite (S91), building a spatial-chromatic transfer function (S94) taking into account a variety of said spectral sensitivities of the photosites, and applying same to the signals emitted by the photosites in order to compensate for the aforementioned variety of sensitivities.

16 Claims, 6 Drawing Sheets

(56) References Cited

U.S. PATENT DOCUMENTS

| | | | |
|---|---|---|---|
| 7,667,750 B2 | 2/2010 | Goto et al. | |
| 8,144,320 B2* | 3/2012 | Potuluri et al. | 356/300 |
| 8,218,208 B2* | 7/2012 | Hayashi | 358/520 |
| 8,780,356 B1* | 7/2014 | Saari et al. | 356/454 |
| 2001/0019361 A1* | 9/2001 | Savoye | 348/222 |
| 2006/0231913 A1 | 10/2006 | Wilsey et al. | |
| 2006/0256214 A1* | 11/2006 | MacLean et al. | 348/234 |
| 2007/0279501 A1* | 12/2007 | Goto et al. | 348/272 |
| 2008/0118181 A1* | 5/2008 | Potuluri et al. | 382/275 |
| 2010/0039642 A1* | 2/2010 | Bahatt et al. | 356/328 |
| 2011/0206291 A1* | 8/2011 | Kashani et al. | 382/255 |
| 2012/0133765 A1* | 5/2012 | Matherson et al. | 348/135 |
| 2012/0212738 A1* | 8/2012 | Bahatt et al. | 356/328 |
| 2012/0293801 A1* | 11/2012 | Kanai et al. | 356/402 |
| 2014/0132778 A1* | 5/2014 | Holub | 348/191 |
| 2014/0176729 A1* | 6/2014 | Saari et al. | 348/182 |
| 2014/0293091 A1* | 10/2014 | Rhoads et al. | 348/234 |

OTHER PUBLICATIONS

Sakoglu, Unal, "Signal-processing strategies for spectral tuning and chromatic nonuniformity correction for quantum-dot IR sensors", The University of New Mexico, Jun. 2006, Albuquerque, NM.

* cited by examiner

DIGITAL PROCESSING FOR COMPENSATING SIGNALS EMITTED BY PHOTOSITES OF A COLOUR SENSOR

The invention relates to the acquisition of color images from a sensor comprising a plurality of photosites, with the sensor having a plurality of spectral sensitivities specific to each photosite.

Increasing sensor resolution (meaning the number of useful pixels per unit of surface area) poses a major problem. Currently, resolutions of 10 megapixels for a surface area of a few square millimeters are being achieved for cameras within the visible spectrum. Of course, this problem can affect other wavelengths (infrared, ultraviolet).

With the increase in resolution, the surface area of the sensitive part of the sensor (the photosites) is drastically reduced. The amount of light reaching a sensor photosite is proportional to the square of its surface area. It is therefore reduced by a base-2 exponential compared to the reduction in photosite surface area. In the visible spectrum, sensors are currently being created with signal-to-noise ratios that no longer allow obtaining satisfactory images under normal light conditions. In the field of digital photography, it is therefore desirable to increase the amount of light reaching the sensor.

Figure 1:
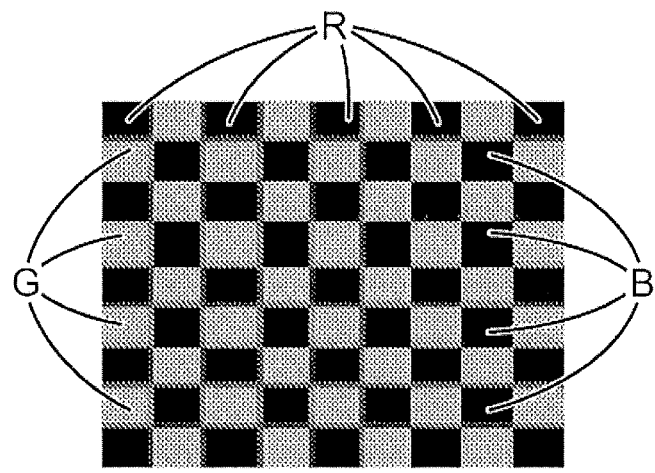

In the case of color image sensors in the visible spectrum, the pixels are "colored" by adding an array of three color filters (Red, Green, Blue) or four color filters (Red, Green, Blue, Emerald) to the surface of the sensor. In this manner, a particular color component is assigned to each pixel. The most popular of the color filter arrays is called the Bayer filter mosaic, as illustrated in FIG. 1, with:

R indicating the color red,
G indicating the color green, and
B indicating the color blue.

Such an array is used to "color" each pixel or photosite of the image sensor with one of the colors R, G, or B, determined by the pattern of the color filter array. Then a color image (having the three color components at each pixel as represented in FIG. 1) is reconstructed from an image formed of a mosaic of the colors red, green and blue.

The main disadvantage of this approach to capturing color images is that the color filters absorb part of the light, which reduces the amount of light reaching the photosite. In addition, the construction of these filters requires several additional operations in the production line.

This invention improves the situation.

To do so, it first proposes a method for the acquisition of color images by a sensor comprising a plurality of photosites having spectral sensitivities which may differ between photosites. In the invention, the method makes use of means for digitally processing signals from the photosites, such digital processing comprising in particular the application to these signals of a spatial-chromatic transfer function taking into account a diversity in the spectral sensitivities of photosites, the sensor then being without a physical color filter array.

The invention thus proposes replacing a physical filtering, using color filters, with a digital processing of signals from the sensor.

First, the spectral transmission characteristics of the photosites must be known and the invention then additionally relates to a method for the spectral calibration of a color image sensor, the sensor comprising a plurality of photosites having spectral sensitivities that may differ between photosites.

Such a method then comprises the following steps:
obtaining spectral sensitivity data for each photosite,
constructing a spatial-chromatic transfer function that takes into account a diversity in said spectral sensitivities of the photosites and is to be applied to signals from the photosites to compensate for this diversity in sensitivities.

The invention also relates to a computer program, comprising instructions for implementing the above method for color image acquisition when it is executed by a processor. An example embodiment of an algorithm for such a program can be represented by the end of the flowchart in FIG. 9, described below as an example embodiment.

The invention also relates to a module for processing digital images from a color image sensor comprising a plurality of photosites, and comprising means for implementing the above image acquisition method. The invention also relates to a system comprising such a module and a sensor connected to this module. The sensor is advantageously without a physical color filter array. Such a system integrating this module is very schematically represented in FIG. 10, described below.

The invention also relates to a computer program, comprising instructions for implementing the method for spectral calibration of a sensor as defined above, when it is executed by a processor. An example of an algorithm for such a program can be represented by the beginning of the flowchart represented in FIG. 9, described below as an example embodiment.

Figure 2:
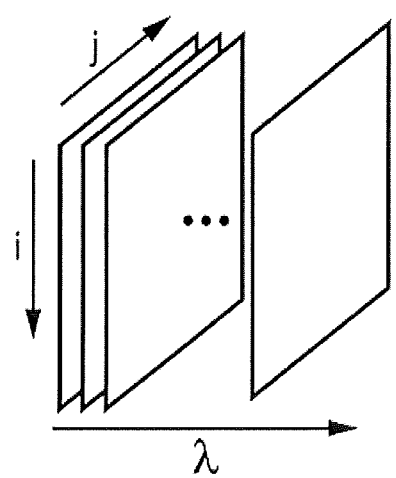
Figure 3:
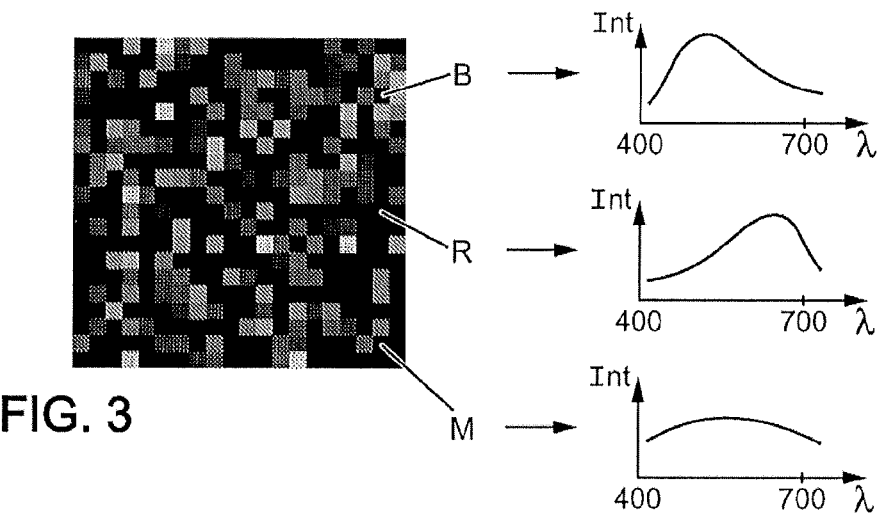
Figure 5:
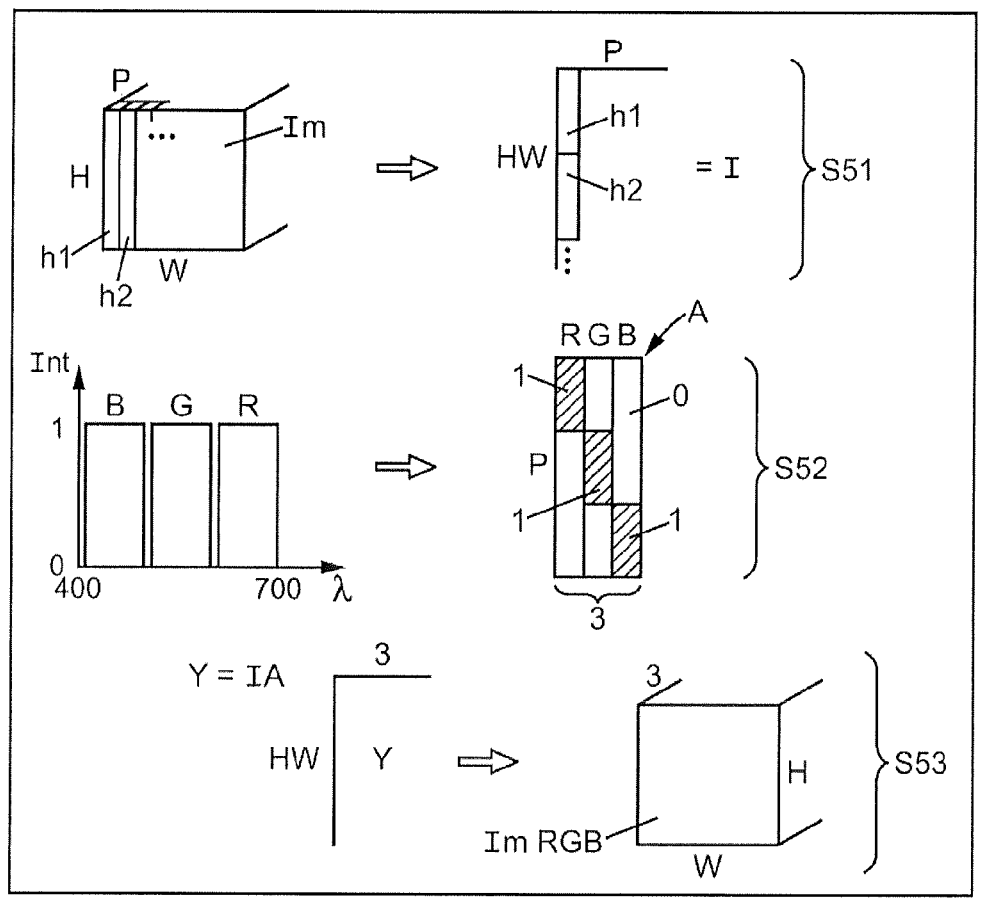
Figure 4:
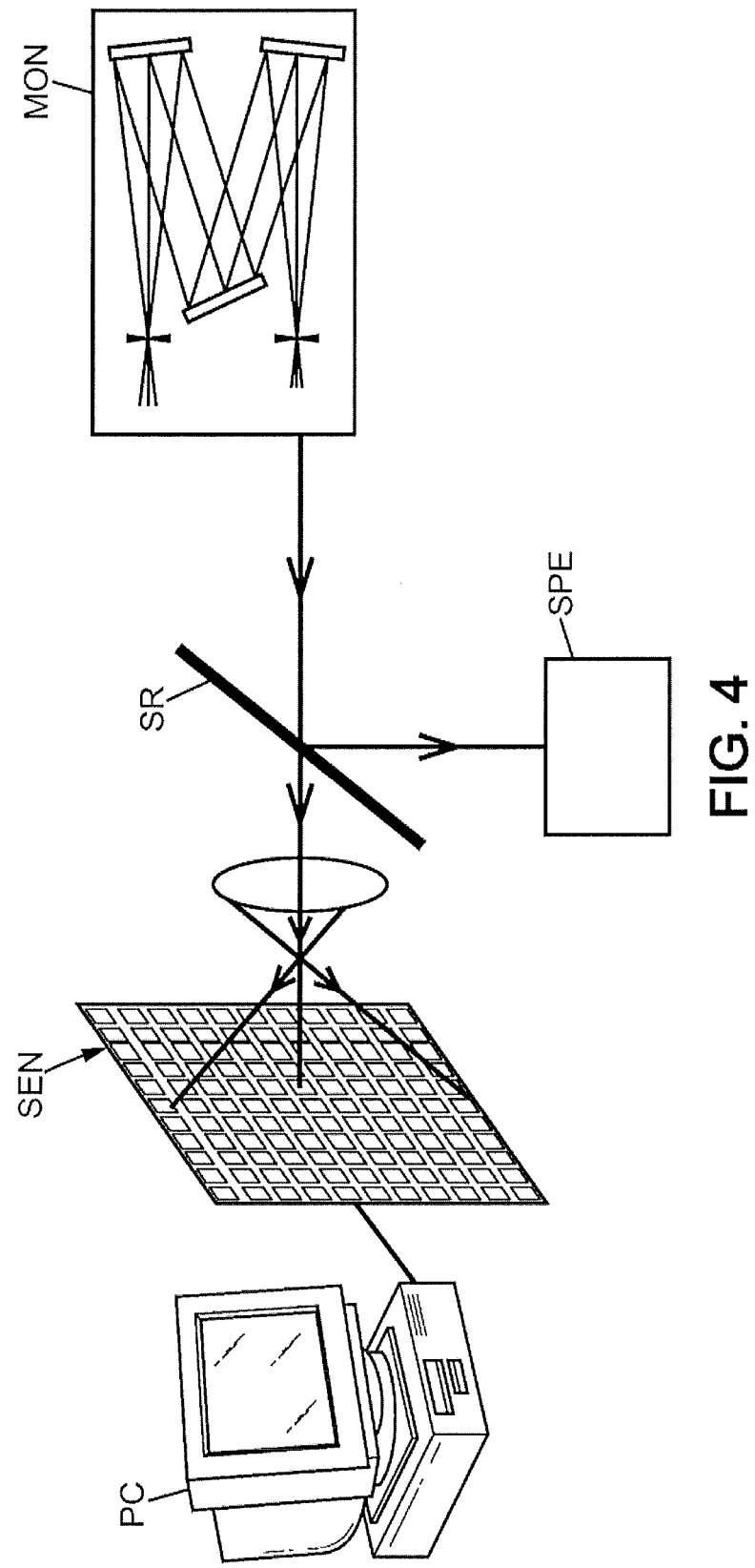
Figure 6:
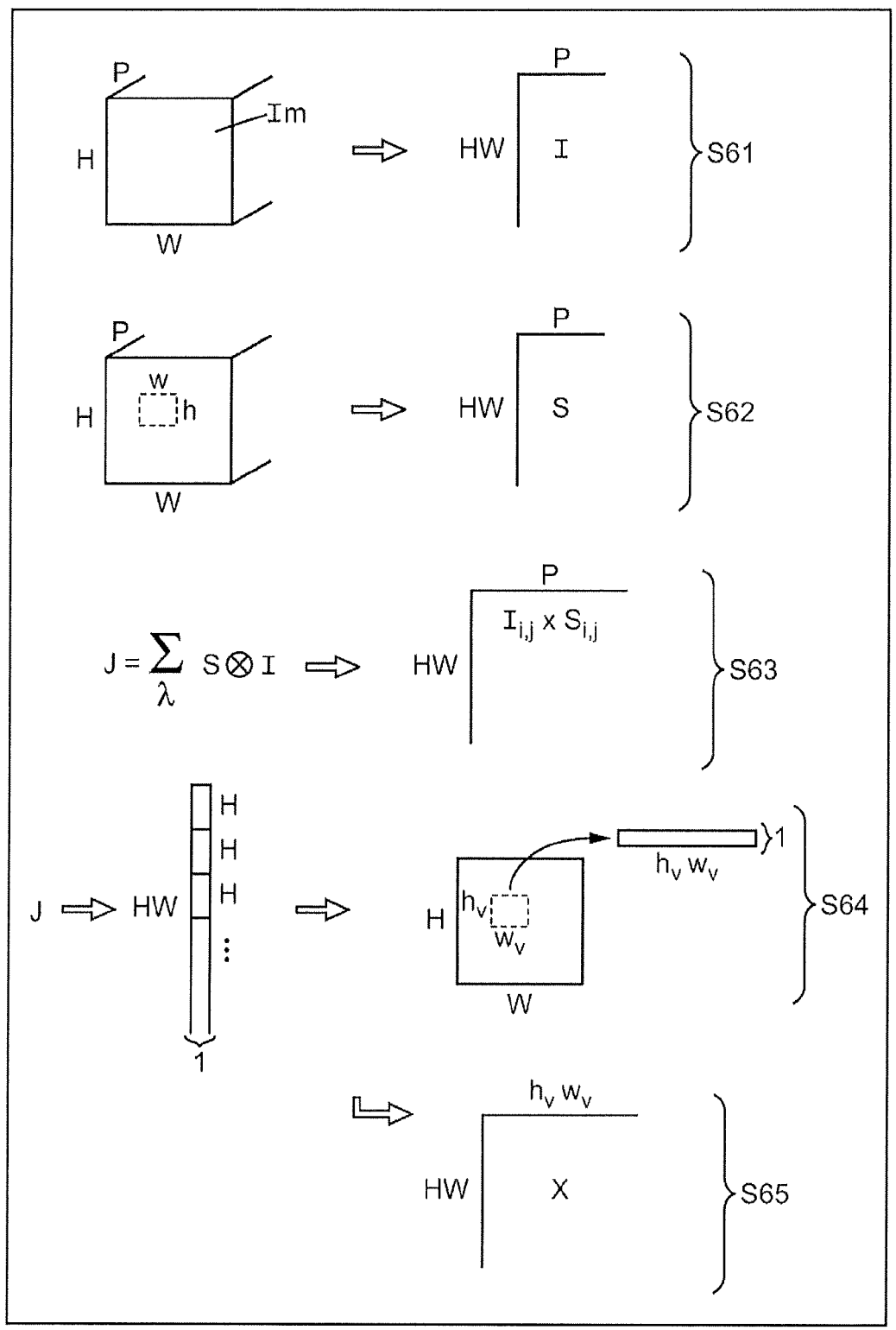
Figure 7:
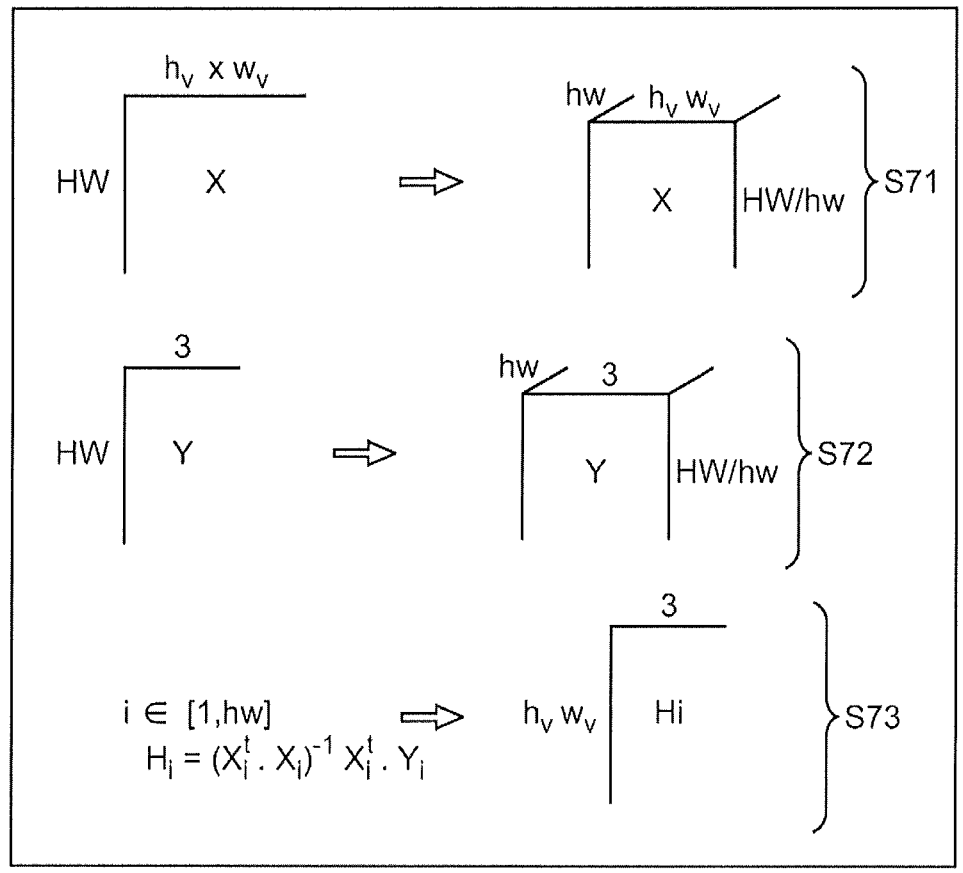
Figure 8:
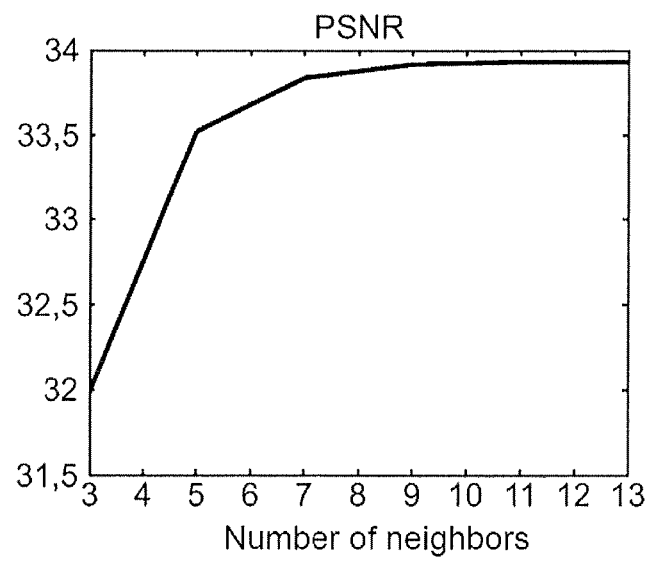
Figure 9:
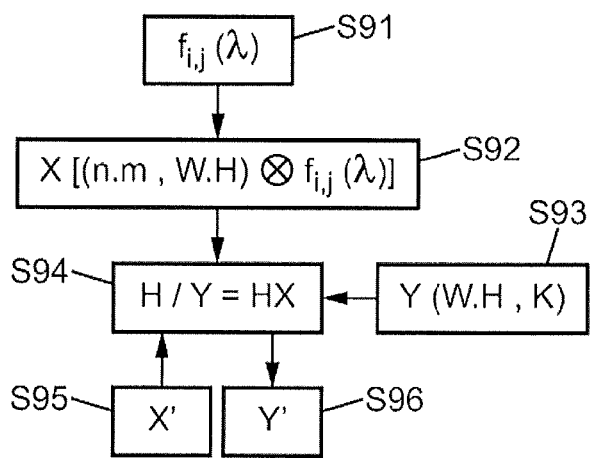
Figure 9A:
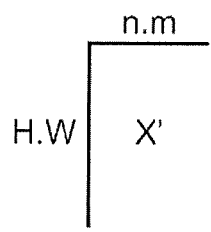
Figure 9B:
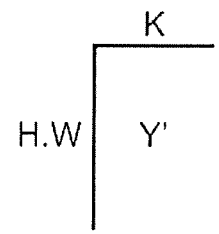
Figure 10:
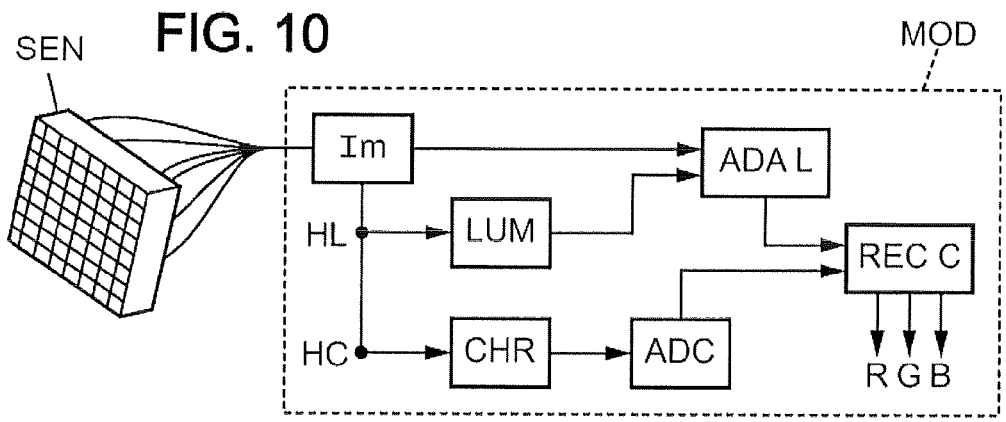

Other features and advantages of the invention will be apparent from reading the following description of some embodiments provided as examples, and the attached drawings in which:

FIG. 1 represents a Bayer color filter array,
FIG. 2 illustrates what is meant by "hyperspectral image",
FIG. 3 illustrates an example of a part of a sensor in which the photosites are of different and random spectral sensitivities,
FIG. 4 schematically illustrates an example of a device for implementing the preliminary calibration step for the sensor,
FIG. 5 illustrates the transformation of a hyperspectral image I into a color image (3 colors RGB in the example represented),
FIG. 6 illustrates the construction of a vector X containing the neighborhood of the hyperspectral image sampled by the sensor,
FIG. 7 illustrates the calculation of reconstruction filters $H_i$ constituting the abovementioned transformation matrix,
FIG. 8 shows the quality of the reconstruction as a function of the size of the abovementioned neighborhood n·m,
FIG. 9 summarizes the main steps of the method of the invention,
FIG. 9a illustrates the form of a captured image matrix X' before the reconstruction transformation in the sense of the invention, used to obtain the transformed matrix Y' of FIG. 9b representing the captured image expressed in a system of K colors (for example the RGB system where K=3),
FIG. 9b represents the form of the matrix so transformed Y',
FIG. 10 shows a very schematic illustration of a system including a module for implementing the image acquisition method defined above.

The invention proposes using the natural dispersion that exists between the photosites of a sensor to permit the sensor to distinguish between the different wavelengths. This dispersion is, of course, random and unpredictable in principle. It is therefore understood that each sensor has its own natural dispersion, subject to manufacturing variations for example.

Even so, the sensor can formally be considered as consisting of many color filters having random and randomly distributed spectral sensitivities. One approach of the invention then consists of reconstructing a color image from the actual image acquired by the sensor, by first defining a model for images captured by the sensor, as described below.

An image sensor without a color filter array can formally be considered a matrix of photosites having a random response to wavelength and a spatial arrangement that is also random. To determine the spectral information output by such a sensor, the invention proposes using hyperspectral images for which a light intensity $I(i,j,\lambda)$ for each pixel is known beforehand (for example measured) in each wavelength.

FIG. 2 shows a representation of what is meant by "hyperspectral image." It is a three-dimensional matrix representation in which each pixel of row j and column i is characterized by a set of intensities in multiple wavelengths $\lambda$.

From such hyperspectral images $I(i,j,\lambda)$, it is possible to simulate an image $X(i, j)$ obtained with a chosen spectral sensitivity $R(\lambda)$, by modulating the gain for each of the composite images of the corresponding hyperspectral image. In practice, the hyperspectral images are defined for finite domains for the wavelength. In particular, there is often hyperspectral image information in 31 wavelengths in the visible spectrum, typically between 400 and 700 nm at 10 nm intervals. The equation for the image then is written as:

$$X(i, j) = \sum_{\lambda=1}^{31} R(\lambda) I(i, j, \lambda) \quad (1)$$

In practice, purely random functions are not chosen for the spectral sensitivity $R(\lambda)$.

For example, silicon has a specific spectral sensitivity. Spectral sensitivity is highly dependent on the photosite manufacturing process, however. Techniques exist to reduce this dispersion, such as regular doping between photosites for example.

To simplify the generation of photosite simulation and control the degree of photosite dispersion, one example embodiment uses Gaussian functions of photosite spectral sensitivity, as follows:

$$R(\lambda) = k \exp\left[-\left(\frac{\lambda - \mu}{\sigma}\right)^2\right] \quad (2)$$

The parameters k, $\mu$ and $\sigma$ are chosen randomly for each photosite. Thus a sensor is simulated having random color sensitivity functions. To restrict the sensitivity functions, intervals of variation for these parameters are chosen as follows:

$k \in [k_{min}; k_{max}]$ $\mu \in [\mu_{min}; \mu_{max}]$ $\sigma \in [\sigma_{min}; \sigma_{max}]$ Thus, to summarize these characteristics in more generic terms, a spectral calibration function $f_{i,j}(\lambda)$ is defined for each photosite i,j in order to modulate the intensity as a function of the wavelength of each pixel of a reference image (for example from a database) in order to construct this reference image as "seen" by the sensor. This modulation amounts to calculating, for each matrix element $X_{i,j}$ in the image matrix X, an expression of the type:

$$X_{i,j} = \sum_{\lambda=1}^{U} R(\lambda) I_{i,j}(\lambda),$$

where:
$I_{i,j}(\lambda)$ is an intensity measurement for a signal from a photosite of row i and column j, at wavelength $\lambda$,
$R(\lambda)$ is a spectral sensitivity function which may, for example, be expressed by a Gaussian of the type:

$$R(\lambda) = k \exp\left[-\left(\frac{\lambda - \mu}{\sigma}\right)^2\right],$$

and U is a number of wavelengths chosen in the visible spectral range (between 400 and 700 nm) at a predetermined interval (for example an interval p=10 nm, which implies a total number U of about thirty wavelengths (31 to be more precise)).

The sensor therefore has a sensitivity function in a particular wavelength for each pixel. An example of different spectral sensitivities of photosites of a sensor have been illustrated in FIG. 3. For example, the photosite denoted R is more "red" than the average for the photosites, while photosite B is more "blue", meaning that white light received by photosite R generates a signal of higher intensity in the red wavelengths (600-700 nm) than photosite B, and in comparison to the intensity of an average photosite M having a more "flat" spectral intensity across the entire visible spectrum 400-700 nm as illustrated in the diagrams on the right in FIG. 3.

After this first step, it is then possible to model the acquisition of a color image by this sensor, using a hyperspectral image according to the above equation (1). Different sensor configurations can be used for this purpose, with values of:
k between 0.5 and 1,
$\mu$ between 450 and 650 nm, and
$\sigma$ between 50 and 200.

However, in principle the sensitivity functions of the sensor are unknown. It is therefore appropriate to calibrate each of the pixels to determine its corresponding function. For this purpose, a calibration step is provided which consists, for example, of using a monochromator MON, as represented in FIG. 4, with which reference images are captured by the sensor SEN for each of the wavelengths between 400 and 700 nm at 10 nm intervals. More specifically, the device of FIG. 4 comprises:

a monochromator MON, able to deliver the light at a chosen, virtually unique wavelength,
a semi-reflective plate SR, able to direct a portion of this light towards a spectrophotometer SPE in order to measure the intensity of the incident light in the spectrophotometer SPE and ultimately deduce the intensity $I_0(\lambda)$ of the light focused on the sensor SEN,
the sensor SEN, each of its photosites intended to issue a signal $I(\lambda)$ varying with the intensity of the light it receives, for each wavelength that the monochromator can supply, and
a computer PC for establishing a relationship, for each wavelength $\lambda$, between the signal intensity $I(\lambda)$ delivered by a photosite and the actual light intensity $I_0(\lambda)$ it received.

Such a device allows measuring the response of each pixel of the sensor for a set of monochromatic wavelengths. This provides a sensitivity image for all pixels in the sensor for each wavelength in said set.

As the image was captured by the sensor at random spectral sensitivities, the color image then needs to be reconstructed. The reconstruction for example of three colors RGB of pixel (i, j) (RGB for Red, Green, Blue, or possibly four colors Cyan, Magenta, Yellow, Black) preferably occurs using neighboring pixels within a rectangular surrounding area ("neighborhood") of size $v_h \times v_w$ in the image captured by the sensor. Each of the neighboring pixels of pixel (i, j) provides richer spatial and spectral information than the one pixel (i, j).

For each pixel (i, j), consider a reconstruction kernel H of size $3 \times v_h v_w$ (or $4 \times v_h v_w$ for four colors) which allows reconstructing RGB color "values" (for example intensities) in the following manner:

$$Y = XH \quad (3),$$

X being a column vector of size $v_h v_w \times 1$ containing the neighborhood of size $v_h \times v_w$ for pixel (i, j) in the image captured by the sensor, Y being a vector of size $3 \times 1$ containing the R, G and B values for pixel (i, j) and H being a matrix of size $3 \times v_h v_w$ containing the filters for reconstructing the color image from the neighborhood.

In principle, in order to initially estimate the kernel H (referred to below as the "reconstruction filter"), a database of reference images is used in which the vectors X and Y are known, and the kernel H is given by the following formula (where $X^t$ indicates the transpose of the matrix X):

$$H = X^t \cdot Y \cdot (X^t \cdot X)^{-1} \quad (4)$$

Preferably, a database of hyperspectral images is used, for example of n=8 images, and the reconstruction filters are calculated for these images.

The principle has been described above. In practice, the first step consists of constructing the RGB image from the hyperspectral image, using the following relation:

$$Y = IA \quad (5)$$

This image is in the form of a vector Y and is constructed as illustrated in FIG. 5, in which:

H indicates the height of the image Im,

W indicates its width, and P indicates the number of wavelength intervals (for example from 400 nm to 700 nm).

Thus the three-dimensional matrix Im contains, for each pixel in a next row H and next column W, the light intensity (or energy or other) of this pixel at a next wavelength P.

During a first step S51, a reference image, for example taken from a database, is initially in the form of this three-dimensional matrix Im. The intensity data as a function of wavelength, contained in the matrix Im, are therefore known for this reference image. Next, a transformation of this three-dimensional matrix to a two-dimensional matrix is conducted by aligning each column h1, h2 of the matrix Im end to end into a single column, for each next wavelength P. A two-dimensional matrix I is thus obtained containing P columns (for example 31 columns at 10 nm intervals between 400 and 700 nm) and HW rows (therefore the total number of pixels in the image). A next step consists of constructing a matrix A, with 3 columns for "Red" R, "Green" G, and "Blue" B, in which the portions with cross-hatching are non-zero matrix coefficients (having a value of "1" for example), and the other coefficients are, for example, zero. The matrix A therefore enables a transformation from a representation with P spectral components (for example 31) to a representation with 3 RGB color components (or in a variant, 4 colors: cyan, magenta, yellow, black for example).

Once this matrix A is constructed in step S52, the matrix Y is formed such that Y=IA in step S53, by simple matrix multiplication. One will then observe that it is possible to deduce from matrix Y a three-dimensional matrix ImRGB representing the RGB colors ("3" axis) specific to each pixel of the image. This matrix Y is then used as the reference for calculating the reconstruction filters as described below.

We will now refer to FIG. 6 to describe the next part of the method.

Step S61 is identical to step S51 of FIG. 5 for obtaining the matrix I. Then, in step S62, the transfer function matrix for the sensor is constructed from the values of k, μ and σ randomly chosen for each pixel. To simplify the calculations and reduce the amount of required data extracted from the database (for example using only 8 reference images), only a part of the image is used, of a smaller size than the image, represented in FIG. 6 as being of size h×w. This "sensor portion" is then replicated so that it is of the same size as the image H·W. FIG. 3 represents an example of a model for a white image captured by this "sensor portion". Of course, this is an example of a specific embodiment; as a variant, all photosites of the sensor H·W could be used to construct the matrix J and not just a "portion" of the sensor. Here, the motivation for choosing a sensor "portion" is the reduction in the amount of information required for estimating the reconstruction, and in this particular case, the reduction in the amount of image information required. It has been observed that only 8 images from a database should be sufficient to implement the method of the invention. Preferably, the chosen images in this case are of sufficient spectral and color contrast to provide a wealth of information.

In the next step S63, the image J to be sampled by the sensor using the matrix S representative of the sensor and the matrix I representative of the hyperspectral image is calculated in the following manner:

$$J = \sum_\lambda S \otimes I \quad (6)$$

where the symbol ⊗ indicates a product of coefficient $S_{i,j}$ of matrix S and coefficient $I_{i,j}$ in matrix I, these products for i,j then being summed over P (for example over 31 wavelengths). The matrix J obtained in step S64 is then a single column with HW coefficients. From this, a matrix J having the dimensions of the image H·W is redetermined. Then in step S65, a new matrix X can be constructed by extracting and concatenating the pixels from each neighborhood of size $h_v \times w_v$ of the image J. This neighborhood serves as input when calculating the filters H. Such processing amounts to considering a neighborhood around each element of matrix J (therefore each pixel), as represented at the end of step S64.

Next, the filters H are calculated as illustrated in FIG. 7, for each of the different positions of the "sensor portion", in order to reconstruct a complete image of H pixels by W pixels. Starting with the matrix X of step 65 in FIG. 6, the neighborhood hw expressed above with reference to step 62 in FIG. 6 is used for expressing the matrix X in the form of a three-dimensional matrix with HW/hw rows, $h_v \times w_v$ columns, for by two-dimensional matrices (step S71). The next step S72 amounts to applying the same processing to the matrix Y of FIG. 5. Then a reconstruction matrix $H_i$ is determined for each neighborhood index i between 1 and hw according to the expression:

$$H_i = (X_i^t \cdot X_i)^{-1} \cdot X_i^t \cdot Y_i$$

(the symbol $X^t$ indicating the matrix transpose of X).

Thus, for each pixel i of the image corresponding to each of the photosites of the sensor, a reconstruction filter $H_i$ is obtained for the three colors RGB (step S73) and for a neighborhood $h_v \times w_v$, around this pixel i. The reconstruction matrix $H_i$ is then optimized by least squares.

As indicated above, to reduce the calculations, a neighborhood 20×20 in size can be chosen which is then duplicated up to the size of the image. This method only applies, however, to sensors of any size if there are sufficient hyperspectral images to conduct the reconstruction filter training. In the first tests conducted, eight images were sufficient because several portions of each one are used for the training. These images are 800 pixels by 800 pixels in size, and as the neighborhood is 20 pixels by 20 pixels, each image provides 1600 samples of 20×20.

The size of the neighborhood that must be used to best reconstruct the images has been optimized. The application of the reconstruction method to several neighborhood sizes, as illustrated in FIG. 8, clearly shows that a larger number of neighborhoods $h_v \times w_v$ (or "n·m" using the notation adopted above in the general description of the invention) improves the quality of the reconstruction. However, the reconstruction performance reaches saturation for a number of neighbors of about 11×11 to 13×13 pixels. A neighborhood of reasonable size, starting at 7×7 pixels, is already usable for image reconstruction. The dimensions of the neighborhood n·m may therefore be greater than or equal to 7×7.

To measure the effect of the training database on the result of the reconstruction, only 7 of the 8 images are used to calculate the filters. The reconstruction filters are then applied to the eighth image. Therefore the image which is not used to calculate the reconstruction filters is successively chosen and the reconstruction is applied to it. A measurement of the difference between the RGB image calculated directly from the hyperspectral image and the one calculated using the hyperspectral image sampled by the sensor, expressed as the peak signal-to-noise ratio PSNR, shows satisfactory results, as does a measurement of the variance in the quality of reconstruction of the image not used to calculate the filters, as illustrated in the following table.

|  | Image | | | | | | | |
|---|---|---|---|---|---|---|---|---|
|  | 1 | 2 | 3 | 4 | 5 | 6 | 7 | 8 |
| 3 × 3 neighbrhd | | | | | | | | |
| PSNR | 32.4544 | 22.8787 | 33.1285 | 34.0158 | 29.9351 | 36.8559 | 31.5964 | 32.2003 |
| Stand. deviation | 0.7651 | 0.4757 | 1.2763 | 0.9833 | 0.7235 | 0.3868 | 1.1460 | 0.7520 |
| 7 × 7 neighbrhd | | | | | | | | |
| PSNR | 39.1815 | 36.4257 | 44.1376 | 34.6090 | 31.0143 | 42.1195 | 36.2391 | 38.6911 |
| Stand. deviation | 0.4621 | 0.4722 | 1.4683 | 0.9025 | 0.6506 | 0.2440 | 1.5322 | 0.5312 |

The influence of parameters k, μ and σ on the reconstruction quality can be evaluated. To do this, first the variability of parameter μ is reduced between 550 and 560 nanometers, with k and σ respectively varying between 0 and 1 and 50 and 200. The average PSNR ratio obtained is 26.3, this time using all images to calculate the reconstruction filter.

It is apparent that, even when the sensitivity functions did not vary in wavelength, it remained possible to reconstruct the colors effectively, probably due to the variation in spectral widths of the sensitivity functions.

The reconstruction result when the variance of the Gaussian of the sensitivity functions does not vary, σ being defined as between 100 and 101, k and σ being respectively between 0.5 and 1 and 450 and 670 nm, gives a PSNR ratio of 28.2.

For k between 0.9 and 1, the PSNR ratio obtained is 28.7.

By simultaneously restricting μ to between 550 and 560 nm and σ to between 100 and 101, but with parameter k having a wide range of between 0.1 and 1, the most unfavorable reconstruction is obtained because the sensitivity functions are all almost identical, with a greatly varying gain. In principle, the gain variation reduces the color reconstruction capabilities. The PSNR ratio obtained in this configuration is 25.6 (although the colors then appear faded compared to the other parameter choices).

Thus, in the method of the invention, the color is reconstructed using the natural variability that exists between photosites. The sensor without a physical color filter array acts like a sensor having sensitivity functions that are random and are randomly distributed across the sensor. For this purpose, the image reconstruction method in the sense of the invention uses:

a prior calibration of the sensor to estimate the sensitivity functions at each of the photosites, an estimation of the reconstruction filters using a database of multispectral images which simulates the capture of an image for the sensor.

Conducted tests show that this type of processing of signals from the sensor can provide satisfactory color reconstruction qualities.

Image capture systems currently being developed, based for example on carbon nanotubes, do not propose defining a spectral sensitivity for each photosite. Such systems are based on doping nanotubes with organic particles, which is difficult to control with precision. In this case, these sensors will behave like a random matrix of photosites with random spectral sensitivities, which it will then be advantageous to process using the method of the invention.

In FIG. 9, the main steps of an example spectral calibration method for a sensor are summarized, as is the subsequent color image acquisition performed by a sensor so calibrated.

For the spectral calibration, let us consider a color sensor for images of H×W pixels, the sensor to be calibrated therefore containing H×W photosites.

The first step a), denoted S91 in FIG. 9, consists, for each sensor photosite of row i and column j, of obtaining a spectral calibration function $f_{i,j}(\lambda)$ giving an intensity for the signal from the photosite i,j as a function of the light wavelength for the photosite. This step can be conducted by measurement with a device such as the example represented in FIG. 4.

A next step b), denoted S92, consists of constructing a first matrix system X, from at least one standard image (reference image, for example from a database) of dimensions H×W and of known light intensity levels at each pixel for at least K colors, said system comprising:

for each row, n·m matrix elements respectively corresponding to intensities of pixels in the neighborhood of a central pixel of the standard image, these intensities each being modulated by a corresponding calibration function $f_{i,j}(\lambda)$ for row i and column j of a pixel of the standard image, for W·H rows.

Here, it is understood that said modulation may correspond to the scalar product of specific matrices "⊗", followed by the sum over all wavelengths to ultimately yield a two-dimensional matrix X, as described above in an example with reference to FIG. 6, said neighborhood $h_v \times w_v$ here being referred to simply as "n·m".

Then for the same standard image, in a step c) denoted S93 in FIG. 9, a second matrix system Y is constructed, comprising:

in each row, the K actual signal intensity levels for said K colors, for each pixel of the standard image,
for W·H rows.

In an example embodiment, this step c) corresponds to constructing the matrix Y obtained by the product Y=IA of FIG. 5.

Recall that a possible implementation of this step consists of determining the matrix A according to the above step a), and in particular:

for each photosite, an intensity value for a signal from the photosite is obtained for P successive wavelengths within a chosen spectral range, a set of P obtained signal intensities forming the spectral calibration function $f_{i,j}(\lambda)$, and the second matrix system Y is advantageously reduced such that for a current image of K colors, by averaging about P/K columns together, K columns forming the second matrix system Y are obtained, each corresponding to a color.

In step d), denoted S94 in FIG. 9, the calibration matrix system H is established for the transformation between the first matrix system X and the second matrix system Y, such that H·X=Y, for example according to the implementation described above with reference to FIG. 7.

The calibration matrix system H then represents the above-mentioned spatial-chromatic transfer "function".

Thus, from a first current matrix system X' constructed by applying step b) to a current image captured by the sensor, an actual distribution of color intensity levels can be obtained according to a second current matrix system Y' for each pixel of this current image, and such that H·X'=Y'.

Again referring to FIG. 9, once the sensor is calibrated by obtaining the matrix system H, the method for the acquisition of images by the sensor can include a compensation for diversity in the spectral sensitivities of the sensor photosites, comprising the following steps.

In a first step a'), denoted S95 in FIG. 9, from at least one current image captured by the sensor and of dimensions W×H, a first current matrix system X' is constructed, comprising:

for each row, n·m matrix elements respectively corresponding to the intensities of pixels within the neighborhood of a central pixel of the current image,
for W×H rows.

The general appearance of this matrix X' has been represented in FIG. 9a.

In a next step b'), the calibration matrix system H is applied to the first matrix system X' in order to obtain in step S96 a second matrix system Y', such that H·X'=Y', the second matrix system Y' comprising:

in each row, an actual distribution of K color intensity levels for each pixel of the current image, for W×H rows, each corresponding to one of the W×H pixels of the current image.

The general appearance of this matrix Y' is represented in FIG. 9b.

The term "matrix system" is used here because said first and second matrix systems (X and Y or X' and Y') may be three-dimensional. For example, for the systems X and Y used for the calibration method (the calibration of the sensor), a third dimension may be specific to an index for a standard image among a plurality of standard images in a database, as described above (for example 8 images of a database). One can then establish a first matrix X and a second matrix Y averaged over the set of images in the database.

As was seen with reference to FIG. 8, it is preferable for the number of neighbors of each pixel considered n·m to be greater than a threshold value, and in particular, preferably greater than or equal to the number of colors K, for the transformation from matrix X (or X') to matrix Y (or Y').

Recall that for each photosite, one can initially obtain an intensity value for the signal from the photosite for P successive wavelengths within a chosen spectral range (for example the visible spectrum between 400 and 700 nm, but also possibly in the infrared for infrared imaging). A set of P obtained signal intensities then forms said spectral calibration function $f_{i,j}(\lambda)$. Thus, as described above with reference to the example embodiment of FIG. 5, the second matrix system Y is reduced for a current image of K colors, by "averaging" together about P/K columns (as illustrated for the construction of the matrix A in step S52) to obtain K columns forming the second matrix system Y and each one advantageously corresponding to a color.

Now with reference to FIG. 10, a system of the invention comprises the sensor SEN with its photosites at which a digital image Im is captured. The module MOD associated with the sensor may comprise for example a sub-module LUM for determining the luminance of the image Im, and a sub-module CHR for determining the chrominance (by the respective functions $H_L$ and $H_C$). The module may additionally comprise a local luminance adaptation sub-module ADAL and a color denoising and amplification sub-module ADC. The module MOD comprises in particular a color reconstruction sub-module, for example in the 3-color RGB system. In a physical implementation, the module MOD can typically comprise a processor, working memory for short-term storage of calculated data, and longer-term memory for storing computer program instructions in the sense of the invention, in particular in order to implement the method for processing captured images.

Of course, the invention is not limited to the embodiment described above as an example; it extends to other variants.

Limited neighborhoods h·w or n·m (for $h_v \cdot w_v$) were described above, of smaller dimensions than the sensor or the total image. This approach reduces the complexity of the calculations, particularly if a "sensor portion" has the randomness characteristics of the sensor as a whole, or if the image is sufficiently rich in local spectral contrast. However, as a variant, these "neighborhoods" may respectively correspond to the entire sensor or entire image.

A 3 color RGB matrix transformation was described above with reference to FIG. 5, with the construction of a matrix of colors A containing 0s or 1s for the three colors red, green, blue (K=3 in FIG. 9b). In a first variant, it is possible to have other coefficients for this matrix A (for example intermediate values, such as 0.5 for the wavelengths between two colors among the three colors red, green, blue). It is also possible to choose more than three spectral bands to define more than 3 colors, for example a band for indigo violet, a band for blue, a band for green, a band for yellow, a band for red, or other bands. Also, in another variant consisting of having a color system without spectral continuity such as cyan, magenta, yellow, black (K=4 in FIG. 9b), it is possible to define several separate spectral bands with non-zero coefficients to construct the matrix A (for example for colors other than black), and possibly spectral bands all with coefficients of zero or less than a threshold value (for example for the definition of black).

An actual measurement of the spectral functions of sensor photosites was described above. As a variant, a standard "sensor portion" could be defined, defining a random pattern typical of the manufacturing conditions for a given sensor series. It is then sufficient to obtain these data from a manufacturer in order to implement the method of the invention.

The invention claimed is:

1. Method for spectral calibration of a color image sensor for images of H×W pixels and comprising H×W photosites, wherein it comprises the steps of:
    a) for each sensor photosite of row i and column j, obtaining a spectral calibration function $f_{i,j}(\lambda)$ giving an intensity for the signal from the photosite i,j as a function of the light wavelength for the photosite,
    b) from at least one standard image of dimensions H×W and of known light intensity levels at each pixel for at least K colors,
    constructing a first matrix system X comprising:
        for each row, n·m matrix elements respectively corresponding to intensities of pixels in the neighborhood of a central pixel of the standard image, said intensities each being modulated by a corresponding calibration function $f_{i,j}(\lambda)$ for row i and column j of a pixel of the standard image,
        for W·H rows,
    c) for said standard image, constructing a second matrix system Y comprising:
        in each row, the K actual signal intensity levels for said K colors, for each pixel of the standard image,
        for W·H rows,
    d) and establishing a calibration matrix system H for the transformation between the first matrix system X and the second matrix system Y, such that H·X=Y,
        the calibration matrix system H representing said spatial-chromatic transfer function,
        in order to obtain, from a first current matrix system X' constructed by applying step b) to a current image captured by the sensor, an actual distribution of color intensity levels according to a second current matrix system Y' for each pixel of this current image, and such that H·X'=Y'.

2. Method according to claim 1, wherein the first and second matrix systems comprise a third dimension specific to an index for a standard image among a plurality of standard images in a database, in order to establish a first matrix X and a second matrix Y averaged over the set of images in the database.

3. Method according to claim 1, wherein the number of pixels in the neighborhood of a central pixel in step b) is greater than or equal to the number of colors K.

4. Method according to claim 1, wherein in step a), for each photosite, an intensity value for the signal from the photosite for P successive wavelengths within a chosen spectral range is obtained, a set of P obtained signal intensities forming the spectral calibration function $f_{i,j}(\lambda)$,
and wherein the second matrix system Y is reduced for a current image of K colors, by averaging together about P/K columns to obtain K columns forming the second matrix system Y and each one corresponding to a color.

5. Method according to claim 1, wherein the K colors are red, green, blue, with K=3.

6. Method according to claim 1, wherein the K colors are black, cyan, yellow, and magenta, with K=4.

7. Method according to claim 1, wherein the dimensions of the neighborhood n·m are greater than or equal to 7×7.

8. Method according to claim 1, wherein the modulation by the calibration function $f_{i,j}(\lambda)$ in step b) amounts to calculating, for each matrix element in the first matrix system X, an expression of the type:

$$X_{i,j} = \sum_{\lambda=1}^{U} R(\lambda) I_{i,j}(\lambda),$$

where:
    $I_{i,j}(\lambda)$ is an intensity measurement for a signal from the photosite of row i and column j, at wavelength $\lambda$,
    $R(\lambda)$ is a spectral sensitivity function,
    U is a number of wavelengths chosen within the visible spectral range, at a predetermined interval.

9. Method according to claim 8, wherein the spectral sensitivity function is expressed by a Gaussian of the type:

$$R(\lambda) = k \exp\left[-\left(\frac{\lambda-\mu}{\sigma}\right)^2\right]$$

10. Method according to claim 8, wherein the predetermined interval is about p=10 nm, yielding a total number U of about thirty wavelengths.

11. A non-transitory computer readable medium storing computer program, comprising instructions for implementing the method according to claim 1 when it is executed by a processor.

12. Method for the acquisition of color images by a sensor comprising a plurality of photosites having spectral sensitivities likely to differ between photosites,
    wherein it makes use of means for digitally processing signals from the photosites, said digital processing comprising the application to said signals of a spatial-chromatic transfer function taking into account a diversity in the spectral sensitivities of the photosites,
    wherein said transfer function is obtained by making use of the calibration method according to claim 1.

13. Acquisition method according to claim 12, said sensor being calibrated using the method according to claim 1 and the calibration matrix system H representing said spatial-chromatic transfer function, wherein the acquisition method includes a compensation for diversity in the spectral sensitivities of photosites, comprising the steps of:
    a') from at least one current image captured by the sensor and of dimensions W×H, constructing a first current matrix system X' comprising:
        for each row, n·m matrix elements respectively corresponding to the intensities of pixels within the neighborhood of a central pixel of the current image,
        for W×H rows,
    b') applying the calibration matrix system H to the first matrix system X' in order to obtain (S96) a second matrix system Y', such that H·X'=Y', the second matrix system Y' comprising:

in each row, an actual distribution of color intensity levels for each pixel of the current image, for W×H rows, each corresponding to one of the W×H pixels of the current image.

14. A non-transitory computer readable medium storing computer program, comprising instructions for implementing the method according to claim 12, when it is executed by a processor.

15. Module for processing digital images from a color image sensor comprising a plurality of photosites, wherein it comprises means for implementing the method according to claim 1.

16. System comprising a module according to claim 15, and a sensor connected to said module, wherein said sensor is without a physical color filter array.

* * * * *